United States Patent
Schürmann

(10) Patent No.: US 10,145,616 B2
(45) Date of Patent: Dec. 4, 2018

(54) METHOD AND SYSTEM FOR THE DENITRIFICATION OF FLUE GASES BY MEANS OF SNCR (SELECTIVE NON-CATALYTIC REDUCTION) AND DOWNSTREAM CATALYST FOR AMMONIA DECOMPOSITION

(71) Applicant: KHD Humboldt Wedag GmbH, Köln (DE)

(72) Inventor: Heiko Schürmann, Leverkusen (DE)

(73) Assignee: KHD Humboldt Wedag GmbH, Köln (DE)

( * ) Notice: Subject to any disclaimer, the term of this patent is extended or adjusted under 35 U.S.C. 154(b) by 0 days.

(21) Appl. No.: 15/303,636

(22) PCT Filed: Apr. 10, 2015

(86) PCT No.: PCT/EP2015/057862
§ 371 (c)(1),
(2) Date: Oct. 12, 2016

(87) PCT Pub. No.: WO2015/155339
PCT Pub. Date: Oct. 15, 2015

(65) Prior Publication Data
US 2017/0038147 A1    Feb. 9, 2017

(30) Foreign Application Priority Data
Apr. 12, 2014    (DE) .................. 10 2014 005 508

(51) Int. Cl.
F27D 17/00    (2006.01)
C04B 7/36    (2006.01)
(Continued)

(52) U.S. Cl.
CPC ........... F27D 17/008 (2013.01); B01D 53/56 (2013.01); B01D 53/75 (2013.01); B01D 53/79 (2013.01);
(Continued)

(58) Field of Classification Search
CPC . F27D 17/008; F27D 17/004; B01D 53/8625; B01D 53/8696; B01D 53/8634;
(Continued)

(56) References Cited

U.S. PATENT DOCUMENTS 5,919,301 A    7/1999    Rother et al.
6,544,032 B1    4/2003    Brentrup
(Continued)

FOREIGN PATENT DOCUMENTS

CH    698991    * 12/2009    ............ B01D 53/86
DE    102009055942    12/2015
(Continued)

OTHER PUBLICATIONS

Machine Translation of CH 698991 to Ulrich.*
(Continued)

*Primary Examiner* — Daniel McCracken
(74) *Attorney, Agent, or Firm* — Greer, Burns & Crain, Ltd.

(57) ABSTRACT

A method for denitrification of flue gases and a system, wherein flue gases generated in a rotary kiln are conveyed to a calcining zone for the deacidification of raw cement meal. Aqueous ammonia solution, ammonia, or ammonia-releasing substances for denitrifying the flue gases injected into the calcining zone according to the method of selective non-catalytic reduction (SNCR), and the flue gas stream, together with an ammonia slip generated during the denitrification, is passed through a heat exchanger and through at least one dedusting device. The flue gas is guided through (Continued)

a exhaust gas line via a catalyst for the decomposition of excess ammonia with residues of nitrogen oxide in accordance with a method of selective catalytic reduction (SCR), wherein the catalyst is arranged in a reactor provided in the exhaust line, and is no larger than is required for a sufficient decomposition of the ammonia.

10 Claims, 1 Drawing Sheet

(51) Int. Cl.
| | | |
|---|---|---|
| *B01D 53/75* | | (2006.01) |
| *B01D 53/79* | | (2006.01) |
| *B01D 53/86* | | (2006.01) |
| *B01D 53/56* | | (2006.01) |
| *F27B 7/20* | | (2006.01) |

(52) U.S. Cl.
 CPC ..... *B01D 53/8625* (2013.01); *B01D 53/8634* (2013.01); *B01D 53/8696* (2013.01); *C04B 7/364* (2013.01); *F27B 7/2025* (2013.01); *F27D 17/004* (2013.01); *B01D 2251/2062* (2013.01); *B01D 2258/0233* (2013.01)

(58) Field of Classification Search
 CPC ........ B01D 53/56; B01D 53/79; B01D 53/75; B01D 2251/2062; B01D 2258/0233; C04B 7/364; C04B 7/434; F27B 7/2025
 See application file for complete search history.

(56) References Cited

U.S. PATENT DOCUMENTS

| | | | |
|---|---|---|---|
| 2011/0311931 A1* | 12/2011 | Fedi | ........................ C04B 7/364 |
| | | | 432/120 |
| 2012/0121472 A1 | 5/2012 | Zurhove | |
| 2012/0315205 A1 | 12/2012 | Schedler et al. | |
| 2014/0134089 A1 | 5/2014 | Archetti | |

FOREIGN PATENT DOCUMENTS

| | | |
|---|---|---|
| EP | 0854339 | 10/2002 |
| EP | 2444145 | 4/2012 |
| WO | 0155048 | 8/2001 |
| WO | 2012176161 | 12/2012 |

OTHER PUBLICATIONS

Douglas, A Hierarchical Decision Procedure for Process Synthesis, AIChE Journal 1985; 31(3): 353-362.*
International Search Report, dated Jun. 8, 2015, for PCT Application WO2015155339.

* cited by examiner

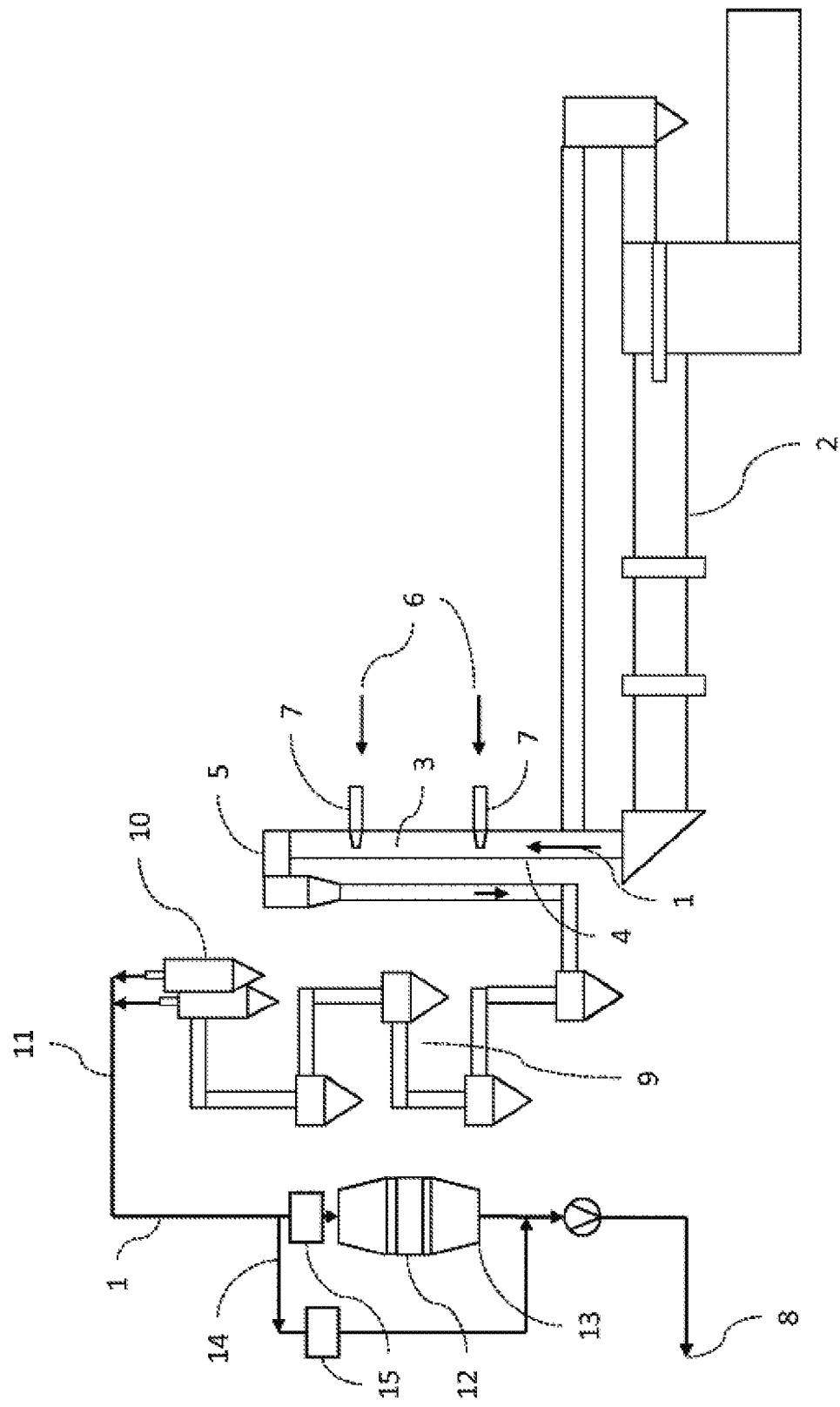

METHOD AND SYSTEM FOR THE DENITRIFICATION OF FLUE GASES BY MEANS OF SNCR (SELECTIVE NON-CATALYTIC REDUCTION) AND DOWNSTREAM CATALYST FOR AMMONIA DECOMPOSITION

RELATED APPLICATIONS

This application is a 371 national phase of International Application No. PCT/EP2015/057862 filed on Apr. 10, 2015, which claims priority to German Patent Application No. 10 2014 005 508.6 filed on Apr. 12, 2014, both of which are incorporated herein by reference.

BACKGROUND OF THE INVENTION

The invention relates to a method of denoxing flue gases, wherein the flue gases which arise in a rotary kiln for sintering of cement clinker are guided into a calcination zone for deacidification of raw meal, aqueous ammonia solution, ammonia ($NH_3$) or substances that release ammonia for denoxing of the flue gases by the method of selective noncatalytic reduction (SNCR) are injected into the calcination zone, and the flue gas stream together with any ammonia slip that arises in the denoxing is guided through a heat exchanger and at least one device for dedusting. The invention further relates to a corresponding plant for denoxing flue gases, having a rotary kiln for sintering of cement clinker, a calcination zone for deacidification of raw meal, preferably formed in a kiln riser duct and/or a calciner, at least one device for injection of aqueous ammonia solution, ammonia ($NH_3$) or substances that release ammonia into the calcination zone, and a heat exchanger having at least one device for dedusting of flue gas which follows on from the heat exchanger, and a heat exchanger offgas conduit which follows on from the latter.

In the production of cement, silicate-containing and carbonate-containing raw meal is sintered in a rotary kiln to give cement clinker. At the high temperatures that are needed for this purpose in the burner flames in the rotary kiln, nitrogen oxides ($NO_x$) form as a result of combustion of the nitrogen present in atmospheric air. A further nitrogen oxide source may be present in the fuel which is used to generate the heat in the rotary kiln. For the emission of nitrogen oxides, however, there are limits stipulated on the part of the legislator, since nitrogen oxides have a number of adverse effects on humans and the environment. More particularly, nitrogen oxides are the cause of acid rain; in addition, they contribute to degradation of ozone in the stratosphere and to global warming. In the production of cement, as in other firing units as well, it is therefore necessary to use methods of denoxing the flue gases that leave the rotary kiln in the opposite direction to the material stream. They flow into a calcination zone in which the raw meal is deacidified. The zone is most frequently formed within the kiln riser duct or within a calciner, or within a kiln riser duct and within a downstream calciner.

A first step for nitrogen oxide reduction is given by the process described in EP0854339A1, the step of conducting the feeding of the cooling zone output air and the addition of the preheated material in a staged manner, such that temperature windows favorable for the nitrogen oxide reduction exist in the calcination zone. For even greater reduction in the nitrogen oxide contents in the flue gas, it is possible to add ammonia ($NH_3$) to the reaction space of the calcination zone. For this purpose, an aqueous ammonia solution, ammonia or a substance that releases ammonia is injected into the calcination zone or into the kiln riser duct and/or the calciner at one or more suitable points. The denoxing here is based on the known method of selective noncatalytic reduction (SNCR), in which ammonia is converted by thermolysis with the nitrogen oxides to nitrogen and water (preferably within a temperature window from 900° to 1000° C.).

The conventional SNCR process is limited by the problem that excess ammonia that does not take part in the nitrogen oxide reduction reaction, called the ammonia slip, is emitted from the plant. However, ammonia likewise has harmful effects to humans and the environment; for example, chronic respiratory pathway disorders can be caused by ammonia. It is considered to be likely that the legislator will set a limit in the near future. The more nitrogen oxides have to be reduced, the greater the slip of ammonia. In order to achieve ever further-reaching degradation of nitrogen oxides without considerable emission of ammonia, therefore, the denoxing is now also undertaken by the method of selective catalytic reduction (SCR), as described, for example in EP2444145A1. In the SCR method, the nitrogen oxides are reduced by a chemical reaction with ammonia over a catalyst, which results in nitrogen and water as products. Frequently, these catalysts consist of titanium dioxide, vanadium pentoxide and/or tungsten dioxide. Even though this method on the one hand offers very high-performance denoxing of flue gases, it has the drawback on the other hand that, in industrial use in cement production, very large catalyst volumes with several catalyst layers have to be installed. Such a technology is associated with very high capital costs and operating costs (in maintenance, repair and cleaning) because of the large catalysts. Furthermore, large catalyst volumes lead to correspondingly high pressure drops in the gas volume flow rate.

It is therefore an object of the invention to propose a method of high-performance denoxing of flue gases with only low emission of ammonia, which is suitable for use in cement production and in which it is possible to use catalysts having advantageously smaller volumes compared to conventional catalysts, especially those used in the SCR method. It is a further object of the invention to propose a plant corresponding to this method for denoxing of flue gases.

SUMMARY OF THE INVENTION

The object of the invention may be achieved by a method of denoxing flue gases having the features of one of more of the various embodiments described herein, and by a plant for denoxing flue gases having the features of one of more of the various embodiments described herein. Further advantageous configurations are specified in the various embodiments described herein.

What is thus envisaged in the method of the invention is to feed the flue gas stream to a catalyst after the SNCR phase of denoxing. After the flue gases have left the calcination zone, they flow, in the method, through a heat exchanger which is customary in the process of cement production with downstream dedusting. Then the dedusted flue gas is guided through the heat exchanger offgas conduit into a reactor in which the catalyst is disposed. The catalyst fulfills the task of bringing about reduction of the ammonia content in the flue gas. In accordance with the catalysts used in the SCR method that have been described at the outset, the reaction between the ammonia slip and nitrogen oxides is catalyzed over said catalyst. The nitrogen oxides are the nitrogen oxide content, which, even if it is below the limit, is still present in the flue gas to a non-negligible degree. The catalyst is thus not used here (primarily) for a reduction of nitrogen oxides, but for substantial lowering of the ammonia content in the flue gas in the heat exchanger offgas conduit. The result of this is that the catalyst can be considerably smaller than a catalyst which has to be used in cement production for the denoxing by the conventional SCR method. The small catalyst volume of the catalyst in the plant proposed in accordance with the invention leads to comparatively low capital and operating costs and to a small pressure drop in the offgas volume flow rate.

Because of the reduction in the amount of ammonia emitted in the downstream catalyst, it is possible, without taking any particular account of any considerable ammonia slip, to add a large amount of ammonia, especially through injection of aqueous ammonia solution into the calcination zone, during the SNCR phase of the process. With such increased amounts of ammonia, it is possible to attain even very restrictive limits for nitrogen oxide emission, with simultaneously no notable emission of ammonia because of the effect of the catalyst.

The amount of the aqueous ammonia solution, the ammonia or the substances that release ammonia to be injected is used to control the emission of nitrogen oxide in accordance with the invention, with release of the flue gas into the environment beyond the catalyst in gas flow direction. For this purpose, the nitrogen oxide content is monitored continuously or at regular, short time intervals in the flue gas, which is released into the atmosphere, for example, through a chimney. In a preferred execution of the invention, the amount to be injected is adjusted such that the given limit in each particular case for the release of nitrogen oxides into the environment is attained or surpassed and, therefore, no further denoxing steps are needed.

The catalyst used for the degradation of ammonia with the residues of nitrogen oxides $NO_x$ that are still present in the flue gas volume stream, in a preferred configuration of the invention, is a generic honeycomb catalyst or a generic plate catalyst, it being possible to use catalyst materials including titanium dioxide, vanadium pentoxide and/or tungsten dioxide in order to catalyze the reaction of the nitrogen oxides with the ammonia. The flue gas is conducted from the heat exchanger/deduster through the heat exchanger offgas conduit to the catalyst, which is disposed in a reactor. The offgas stream that leaves the reactor, after passing through a compressor, is typically sent to a chimney for release into the free atmosphere. The catalyst serves to degrade excess ammonia with nitrogen oxides. The amount of the nitrogen oxides in the flue gas volume stream has already been lowered in the SNCR stage of the method to (or below) the emissions limit currently required, with residues of nitrogen oxides still present in the flue gas stream that reaches the catalyst through the heat exchanger offgas conduit. Since the catalyst serves merely for degradation of ammonia slip, the dimensions of the catalyst can be considerably smaller than in the case of the catalysts which typically have to be used for degradation of the comparatively large amount of nitrous gases with the aid of ammonia in SCR methods in cement production. A smaller catalyst volume offers a number of important advantages over larger volumes: capital costs and operation of the catalyst are more economically favorable, the pressure drop in the reactor is smaller and the cleaning of the catalyst is simpler. In a preferred execution of the invention, only one catalyst layer is arranged in the reactor. Also provided in the reactor is a device which can accommodate a further catalyst layer. In the case that the catalyst layer present in the process has to be exchanged, it is thus possible, at the same time as the deinstallation thereof, to install another catalyst layer into the device that was previously unoccupied, which advantageously shortens the catalyst exchange operation. In the next exchange, the first device for accommodation of a catalyst layer is again filled.

One configuration of the invention envisages a bypass conduit in the region of the heat exchanger offgas conduit. If the catalyst is currently being maintained or repaired, or unforeseen faults in the catalyst function occur, the offgas stream from the heat exchanger can bypass the catalyst in this way. If the regulations for the limits relating to emission of ammonia permit it, the flue gas is released via a motor-driven compressor and through a chimney directly into the free atmosphere. This conduction of offgas, which only lasts for a short period, is preferable to the considerable economic damage that would arise through running down the plant for cement production in the calcining and sintering region. Moreover, the addition of ammonia in this phase can be reduced to such an extent as to assure compliance with $NO_x$ limits. For the blocking of the path of the offgas stream through the catalyst, and likewise for the blocking of the bypass conduit which is implemented in the normal case, components for blocking or flow regulation of gas streams in pipelines are used in each case, for example barrier gate valves, barrier flaps, ballcocks or valves.

After the phase of the SNCR method, in accordance with the invention, the flue gas, immediately after flowing through the heat exchanger, is guided into at least one device for separation of dust particles out of the flue gas. Typically, cyclones that rely on the effect of centrifugal forces are used. The use of electrostatic and fabric filters is also possible, the overall efficiency of the system being an important parameter for the selection of the type of deduster. It is one of the advantages of the method proposed here that it is already largely dedusted flue gas that flows into the catalyst. This eliminates the need for uneconomic cleaning which has to be conducted at high frequency for avoidance of shutdown, of the kind that has to be conducted in catalysts in methods where non-dedusted flue gas is guided through an SCR catalyst. Prior deposition of erosive constituents in the flue gas also prolongs the catalyst lifetime.

Since, in spite of the dedusting of the flue gas stream from the heat exchanger, small amounts of dust particles are still present in the flue gas stream, and these settle on the catalyst at least to a certain degree or block its fine structures, one configuration of the invention envisages cleaning of the surface of the catalyst to remove solid particles in the method. Preference is given here to using generic dust blowers which use compressed air (and optionally additional acoustic pressure) to clean the relevant faces of the catalyst. It is also advantageously possible to include the reactor walls in the cleaning process. With empirical knowledge of the average degree of contamination, the cleaning is preferably conducted at suitable regular intervals without shutdown of the plant.

The SNCR process reactions entail specific thermodynamic prerequisites, particularly the existence of suitable temperature windows. The addition of ammonia through injection of aqueous ammonia solution, ammonia or substances that release ammonia into the calcination zone which is preferably formed in a kiln riser duct and/or a calciner will therefore advantageously be effected at two or more injection levels, in a configuration of the invention, depending on the actual parameters of the particular plant and the process regime. The injection at each of the levels is especially switched on or off depending on the temperature conditions that prevail there, which are measured by means of corresponding devices for measurement of the gas temperatures, for example by the method of acoustic gas temperature measurement, in the particular section of the calcination zone. In addition, in a further configuration of the invention, the injection is undertaken via one injection device for each level, each of which has at least one injection probe. The control of the injection probes at one level can be undertaken independently of the control of the injection probes at every other level.

The method proposed is not limited to use in the production of cement, but is suitable for all firing units where high-performance denoxing of flue gases is required. In principle, the chemical and thermodynamic conditions suitable for the SNCR method and the injection of ammonia which is effected therein are required, as are the suitable conditions for the degradation of excess ammonia with nitrogen oxides or co-reactants having a comparable effect over a small catalyst in an operation corresponding to the SCR method.

BRIEF DESCRIPTION OF THE DRAWINGS

The invention is elucidated in detail by the FIGURE which follows and wherein:

FIG. 1 shows a plant of the invention for denoxing flue gases in a simplified schematic cross section.

DETAILED DESCRIPTION OF THE PREFERRED EMBODIMENTS

FIG. 1 shows, in a plant of the invention for denoxing flue gas 1, in schematic form, the path of the flue gas 1 in that section of the cement production that relates to the denoxing of the flue gas 1. The flue gas 1 flows out of the rotary kiln 2 for sintering of cement clinker into the calcination zone 3 which, in the working example shown, extends over part of the kiln riser duct 4 and a calciner 5. In the SNCR method, sufficient ammonia 6 as an aqueous solution is injected into the calcination zone 3 through the injection probes 7 at a plurality of levels that, on flue gas emission 8, the limits that apply to nitrogen oxides are complied with. The injection is controlled at the individual levels according to the temperature windows measured (not depicted). The flue gas 1 that has been denoxed for the most part flows together with the excess proportion of ammonia 6 unconverted in the denoxing through the heat exchanger 9 that serves for preheating of the raw meal for the cement production, and through the device for dedusting 10, duplicated in the working example shown, in the form of cyclones here, into the heat exchanger offgas conduit 11.

The flue gas 1 which has been largely freed of solid particles is guided through the heat exchanger offgas conduit 11 to the catalyst 12, which preferably takes the form of a honeycomb or plate catalyst and is disposed in a reactor 13. The catalyst 12 may have comparatively small dimensions and preferably consists of just one layer. In the method proposed here, in analogy to the SCR method, the ammonia slip is largely degraded over the catalyst 12 with nitrogen oxides to give nitrogen and water, the nitrogen oxides originating from the nitrogen oxide content still present in the flue gas 1. In this way, it is possible by the process proposed to achieve high-performance denoxing of flue gases 1 through excessive injection of ammonia 6 during the SNCR phase without leading to considerable emission 8 of ammonia 6 in the flue gas 1.

The reactor 13 preferably has a device for accommodation of a second catalyst layer (not depicted). If the catalyst layer in operation has to be replaced owing to maintenance or wear, it is possible in an economically favorable manner to install a new catalyst layer into the reactor 13 simultaneously with the deinstallation of this layer in said device. During the phase of exchange of the catalyst layer and in the event of any other problems with the catalyst 12 or reactor 13, the stream of flue gas 1 can be diverted into a bypass conduit 14 that bypasses the reactor 13. A system of devices for blockage 15 of the flow of the flue gas 1, for example arrangements of barrier gate valves, barrier flaps, ballcocks or valves, regulates the flow rates of the flue gas 1 through the reactor 13 or bypass conduit 14.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMERALS

1 Flue gas
2 Rotary kiln
3 Calcination zone
4 Kiln riser duct
5 Calciner
6 Ammonia
7 Injection probe
8 Flue gas emission
9 Heat exchanger
10 Device for dedusting
11 Heat exchanger offgas conduit
12 Catalyst
13 Reactor
14 Bypass conduit
15 Device for blocking

The invention claimed is:

1. A method of denoxing flue gases comprising:
   guiding flue gases which arise in a rotary kiln for sintering of cement clinker into a calcination zone for deacidification of raw meal,
   injecting aqueous ammonia solution, ammonia ($NH_3$) or substances that release ammonia for denoxing of the flue gases by the method of selective noncatalytic reduction (SNCR) into the calcination zone, and
   guiding the flue gas stream together with any ammonia slip that arises in the denoxing through a heat exchanger and at least one device for dedusting,
   wherein
   the flue gas stream is conducted from the heat exchanger through a heat exchanger offgas conduit via a catalyst for degradation of excess ammonia with residues of nitrogen oxide present in the flue gas over the catalyst in accordance with a method of selective catalytic reduction (SCR), and,
   wherein the catalyst is disposed in a reactor provided within the heat exchanger offgas conduit, and,
   wherein the flue gas stream, in the event of problems with, repair of, or maintenance of the catalyst, is guided through a bypass conduit to bypass the catalyst.

2. The method as claimed in claim 1, wherein the addition of ammonia is effected by injection of aqueous ammonia solution, ammonia or substances that release ammonia into the calcination zone at least two injection levels, each injection level being switched on and off individually depending on the fitting of the temperatures that exist at each injection level into a favorable temperature window for the SNCR process reactions.

3. The method as claimed in claim 1, wherein the amount of the aqueous ammonia solution, the ammonia or the substances that release ammonia injected is used to control the emission of nitrogen oxide, with release of the flue gas from the heat exchanger into the environment beyond the catalyst in gas flow direction, and the amount injected is adjusted such that the given limit in each particular case for the release of nitrogen oxides into the environment is attained or surpassed.

4. The method as claimed in claim 1, wherein a surface of the catalyst is cleaned to remove solid particles with compressed air.

5. A plant for denoxing flue gases comprising:
a rotary kiln for sintering of cement clinker,
a calcination zone for deacidification of raw meal,
at least one device for injection of aqueous ammonia solution, ammonia ($NH_3$) or substances that release ammonia into the calcination zone, and
a heat exchanger having at least one device for dedusting of flue gas which follows on from the heat exchanger, and a heat exchanger offgas conduit which follows on from the latter,
wherein in the heat exchanger offgas conduit there is disposed a reactor having a catalyst for degradation of ammonia with nitrogen oxides present in the flue gas stream from the heat exchanger, and,
wherein the calcination zone is formed in a kiln riser duct, a calciner, or both.

6. The plant as claimed in claim 5, wherein at least two injection levels are provided for the injection of aqueous ammonia solution, ammonia or substances that release ammonia into the calcination zone, wherein
one of the at least one device for injection is arranged at each injection level, each device for injection having at least one injection probe,
a control unit for the flow rate of the at least one injection probe is provided at each injection level, the control unit for the at least one injection probe at one level being independent of the control unit of the injection probes at all other levels, and
at least one device for measurement of the gas temperature in the corresponding section of the calcination zone is disposed at each injection level, the control of the flow rate of each injection probe being aligned to the gas temperature.

7. The plant as claimed in claim 5, wherein the catalyst is a honeycomb catalyst or a plate catalyst and only one catalyst layer is arranged in the reactor, with a device for receiving a second catalyst layer provided in the reactor.

8. The plant as claimed in claim 5, wherein a bypass conduit for bypassing the catalyst is arranged beyond the heat exchanger in flue gas flow direction, with at least one device for blocking the flow of the flue gas each provided both within the bypass conduit and directly upstream of the catalyst.

9. The plant as claimed in claim 5, wherein at least one dust blower for cleaning the catalyst surface is disposed in the reactor containing the catalyst.

10. The method of claim 4 wherein the cleaning is conducted at regular time intervals depending on the degree of contamination.

* * * * *